United States Patent
Chen

(10) Patent No.: US 12,553,614 B1
(45) Date of Patent: Feb. 17, 2026

(54) WIRELESS CHARGING AND HEATING LUNCHBOX

(71) Applicant: Yongjin Chen, Jiangxi (CN)

(72) Inventor: Yongjin Chen, Jiangxi (CN)

( * ) Notice: Subject to any disclaimer, the term of this patent is extended or adjusted under 35 U.S.C. 154(b) by 0 days.

(21) Appl. No.: 19/265,316

(22) Filed: Jul. 10, 2025

(30) Foreign Application Priority Data

Apr. 10, 2025 (CN) .......................... 202520671199.4

(51) Int. Cl.
*F24C 7/10* (2021.01)
*H02J 50/00* (2016.01)
*H05B 3/14* (2006.01)

(52) U.S. Cl.
CPC ................. *F24C 7/10* (2013.01); *H02J 50/00* (2016.02); *H05B 3/145* (2013.01); *H05B 2214/04* (2013.01)

(58) Field of Classification Search
CPC .. H05B 1/0252; H05B 1/0258; H05B 1/0261; H05B 1/0263; H05B 1/0275; H05B 1/0286; H05B 3/0071; H05B 3/0076; H05B 3/008; H05B 3/145; H05B 2214/04
USPC ........................................................ 219/387
See application file for complete search history.

(56) References Cited

U.S. PATENT DOCUMENTS

| | | | | |
|---|---|---|---|---|
| 4,798,936 A | * | 1/1989 | Johnson, Sr. ........ | A47C 21/048 219/217 |
| 6,047,976 A | * | 4/2000 | Wang ..................... | A45C 11/20 280/37 |
| 6,433,317 B1 | * | 8/2002 | Arx .......................... | H05B 3/28 219/544 |
| 2009/0129057 A1 | * | 5/2009 | Gietl ........................ | G09F 9/33 362/97.1 |
| 2011/0092923 A1 | * | 4/2011 | Bhamre ................... | A47K 7/03 604/290 |
| 2017/0137205 A1 | * | 5/2017 | Graf ....................... | A45C 13/005 |
| 2022/0214015 A1 | * | 7/2022 | Mary ..................... | F17C 13/025 |

* cited by examiner

*Primary Examiner* — Sang Y Paik
(74) *Attorney, Agent, or Firm* — HOWARD M COHN and Associates, LLC

(57) ABSTRACT

A wireless charging and heating lunchbox is provided, including a multifunctional cover body, an outer box body, a power supply display module, a food container body, a fixing frame, and a five-sided heating module. The wireless charging and heating lunchbox is simple and reasonable in structure, with low manufacturing cost and convenient installation. The multifunctional cover body facilitates easy removal and placement the food container body for food placement, and further defines the accommodating groove for storing utensils, which is convenient and hygienic to use. Moreover, the wireless charging and heating lunchbox has both wireless and wired charging functions, allowing flexible selection according to usage scenarios. Through the power supply display module, battery power is intuitively viewed, ensuring normal power supply to the wireless charging and heating lunchbox, and the power supply display module further has a timer function to enable users to schedule heating in advance.

7 Claims, 5 Drawing Sheets

WIRELESS CHARGING AND HEATING LUNCHBOX

TECHNICAL FIELD

The present disclosure relates to the field of lunchboxes, and in particular to a wireless charging and heating lunchbox.

BACKGROUND

In daily life, the demand for lunchboxes has become increasingly diverse. conventional lunchboxes offer relatively singular functionality, merely enabling simple food containment, and fail to meet people requirements for food temperature across different scenarios. For example, for individuals frequently engaged in work-, study-, or travel-related mobility, ensuring access to warm meals in the absence of heating equipment, such as microwaves, is difficult, which not only impacts dining experience but also poses potential long-term adverse health effects from consuming cold food.

With continuous technological advancements and the accelerating pace of modern life, lunchboxes equipped with heating functions have emerged. However, early heating lunchboxes mostly suffered from numerous limitations. Some utilized wired power supply, requiring users to locate power sockets during use, which is highly inconvenient in outdoor settings or locations with limited power access, severely restricting applicability. Furthermore, conventional heating methods in such lunchboxes were often uneven, leading to localized overheating or inadequate heating of food, compromising both taste and nutritional integrity.

Additionally, regarding utensil storage, conventional lunchboxes lack dedicated compartments, mixed storage of utensils and food is unhygienic and further increases a risk of utensil loss or damage to internal structures in the conventional lunchboxes during transport. To address this series of problems and satisfy the demand for convenient, efficient, and fully functional lunchboxes, development of a novel wireless charging heating lunch box has become imperative.

SUMMARY

An object of the present disclosure is to provide a wireless charging and heating lunchbox capable of overcoming disadvantages of conventional lunchboxes, including single functionality, inconvenient heating, uneven heating, and deficient utensil storage arrangements.

Technical solutions for overcoming the disadvantages adopted by the present disclosure are as follows.

The present disclosure provides the wireless charging and heating lunchbox, including a multifunctional cover body, an outer box body, a power supply display module, a food container body, a fixing frame, and a five-sided heating module. The power supply display module is disposed at an inner lower side of the outer box body. The five-sided heating module is fixedly connected in the outer box body through the fixing frame, and the five-sided heating module is electrically connected to the power supply display module. The food container body is disposed at an inner upper side of the five-sided heating module. The multifunctional cover body is connected to an upper side of the fixing frame.

Furthermore, the multifunctional cover body includes a top cover, an accommodating groove, a handle, a covering portion, and two fixing clasps. The accommodating groove is defined on one side of an upper surface of the top cover, and the covering portion is disposed on the accommodating groove. Two ends of the handle extending downward is movably connected to central upper portions on both sides of the top cover. The two fixing clasps are respectively movably connected to central lower portions of two side surfaces of the top cover, and upward-facing surfaces of lower portions of the two fixing clasps are respectively engaged with protrusions at central positions on both sides of the fixing frame.

Furthermore, the top cover includes a handle recess at an upper side edge thereof for receiving the handle.

Furthermore, the power supply display module includes a transparent protective plate, a connecting plate, a display screen, a battery, a battery cover, a circuit board, and a charging module. The connecting plate is fixedly connected to a front central opening of the outer box body, the transparent protective plate is fixedly connected to an outer side of a central opening of the connecting plate, and the display screen is fixedly connected to an inner side of the central opening of the connecting plate. The battery is fixedly connected to an inner lower central portion of the outer box body through the battery cover. The circuit board is fixedly connected to an inner lower rear side of the outer box body, a power terminal of the circuit board is electrically connected to the battery, the charging module is disposed at a rear side of the circuit board, and an output terminal of the circuit board is electrically connected to the five-sided heating module.

Furthermore, the charging module is a wireless charging module or a wired charging module.

Furthermore, the five-sided heating module includes a heat-conducting inner liner, a five-sided heating sheet, and a heat-insulating box body. An outer portion of the heat-insulating box body is fixedly connected to an inner portion of the outer box body through the fixing frame, the heat-conducting inner liner is fixedly connected to an inner portion of the heat-insulating box body, and the five-sided heating sheet is fixedly connected to an outer surface of the heat-conducting inner liner.

Furthermore, the five-sided heating sheet is a graphene five-sided heating sheet.

Beneficial effects of the present disclosure are as following.

First, the present disclosure is simple and reasonable in structure, with low manufacturing cost and convenient installation. The multifunctional cover body facilitates easy removal and placement the food container body for food placement, and further defines the accommodating groove for storing utensils, which is convenient and hygienic to use.

Second, the present disclosure has both wireless and wired charging functions, allowing flexible selection according to usage scenarios. Through the power supply display module, battery power is intuitively viewed, ensuring normal power supply to the wireless charging and heating lunchbox.

Third, the present disclosure further provides the five-sided heating module, which utilizes the graphene five-sided heating sheet to comprehensively heat the heat-conducting inner liner, causing the food container body placed therein to be uniformly heated, thereby ensuring even heating of food to improve heating effectiveness and food taste.

Fourth, during carrying, the wireless charging and heating lunchbox is easily lifted by lifting the handle on the multifunctional cover body. When the handle is not used, the handle is received in the handle recess on the top cover, avoiding shaking that affects portability. An overall function of the wireless charging and heating lunchbox is complete, thereby satisfying diverse usage requirements.

Figure 1:
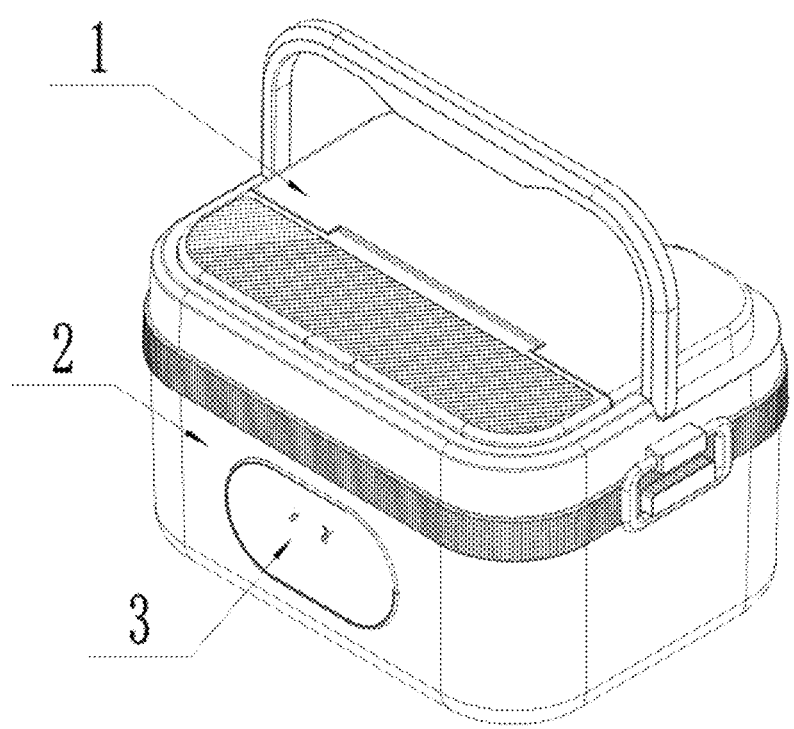
FIG. 1 is a structural schematic diagram of to the present disclosure.

Reference numerals in the drawings: 1. multifunctional cover body; 2. outer box body; 3. power supply display module; 4. food container body; 5. fixing frame; 6. five-sided heating module; 11. top cover; 12. accommodating groove; 13. handle; 14. covering portion; 15. fixing clasp; 31. transparent protective plate; 32. connecting plate; 33. display screen; 34. battery; 35. battery cover; 36. circuit board; 37. charging module; 61. heat-conducting inner liner; 62. five-sided heating sheet; 63. heat-insulating box body.

DETAILED DESCRIPTION OF EMBODIMENTS

Figure 2:
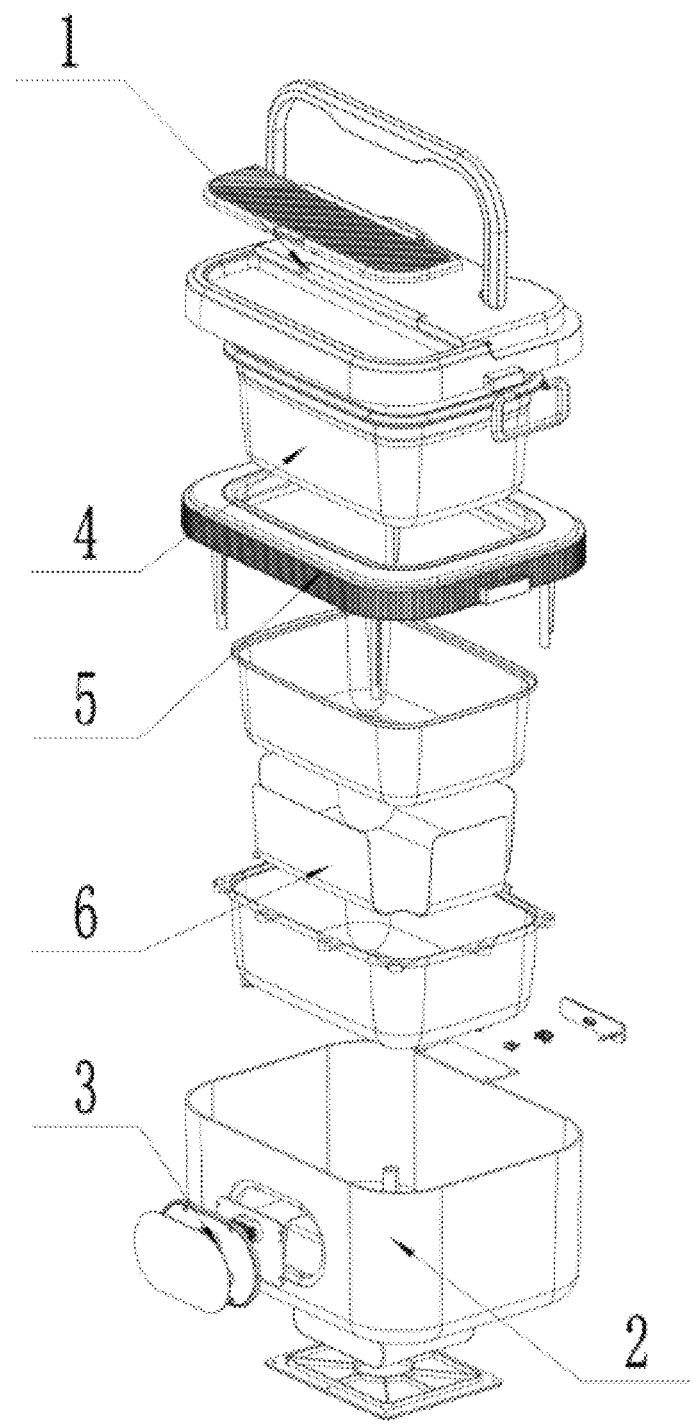
FIG. 2 is an exploded schematic diagram of FIG. 1.

As shown in FIGS. 1-2, embodiments of the present disclosure provide a wireless charging and heating lunchbox, including a multifunctional cover body 1, an outer box body 2, a power supply display module 3, a food container body 4, a fixing frame 5, and a five-sided heating module 6. The power supply display module 3 is disposed at an inner lower side of the outer box body 2. The five-sided heating module 6 is fixedly connected in the outer box body 2 through the fixing frame 5, and the five-sided heating module 6 is electrically connected to the power supply display module 3. The food container body 4 is disposed at an inner upper side of the five-sided heating module 6. The multifunctional cover body 1 is connected to an upper side of the fixing frame 5.

Figure 3:
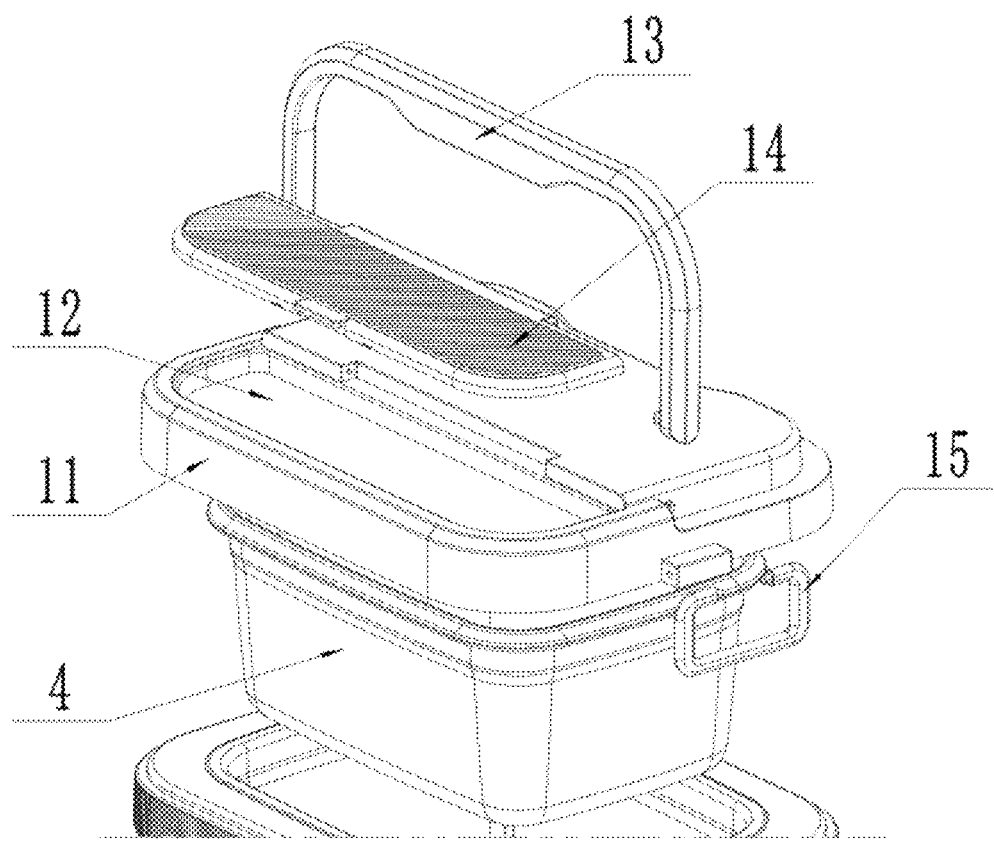
FIG. 3 is a structural schematic diagram of a multifunctional cover body.

As shown in FIG. 3, the multifunctional cover body 1 includes a top cover 11, an accommodating groove 12, a handle 13, a covering portion 14, and two fixing clasps 15. The accommodating groove 12 is defined on one side of an upper surface of the top cover 11, and the covering portion 14 is disposed on the accommodating groove 12. Two ends of the handle 13 extending downward is movably connected to central upper portions on both sides of the top cover 11. The two fixing clasps 15 are respectively movably connected to central lower portions of two side surfaces of the top cover 11, and upward-facing surfaces of lower portions of the two fixing clasps 15 are respectively engaged with protrusions at central positions on both sides of the fixing frame 5.

Specifically, the top cover 11 includes a handle recess at an upper side edge thereof for receiving the handle 13.

Figure 4:
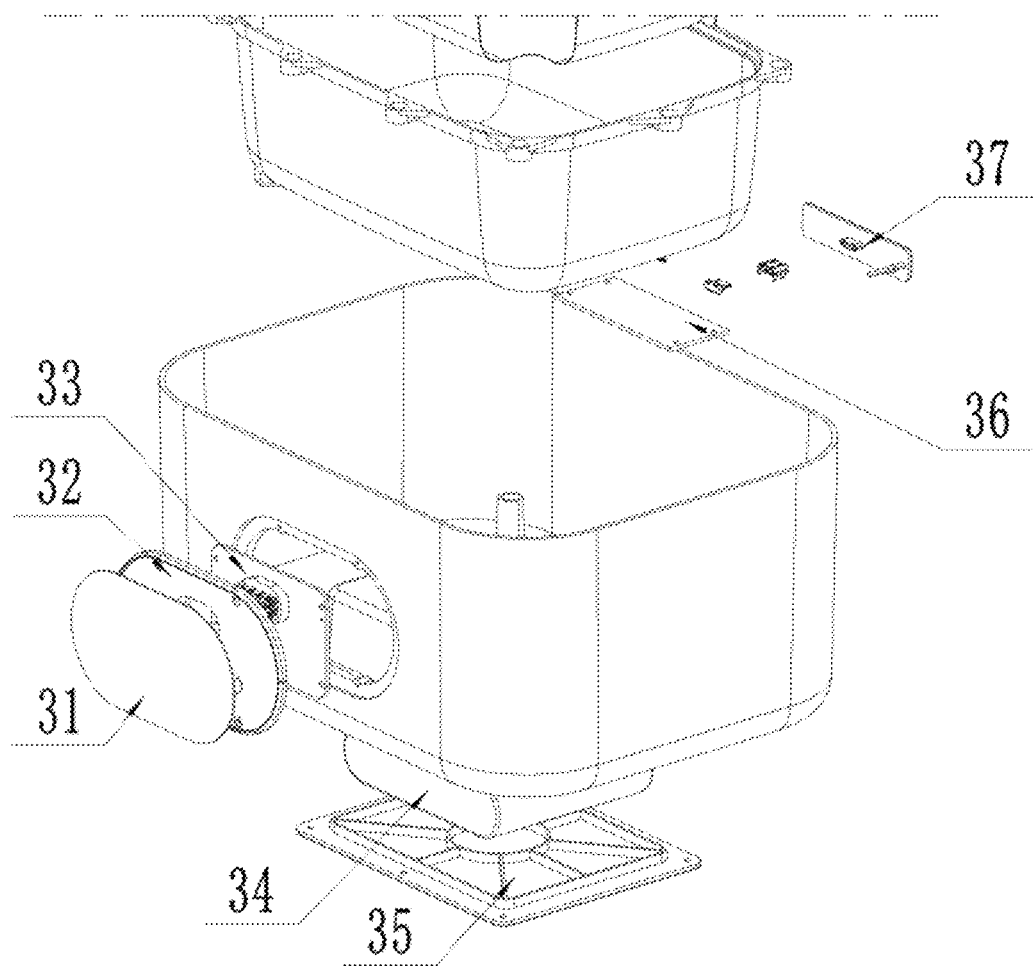
FIG. 4 is a structural schematic diagram of a power supply display module.

As shown in FIG. 4, the power supply display module 3 includes a transparent protective plate 31, a connecting plate 32, a display screen 33, a battery 34, a battery cover 35, a circuit board 36, and a charging module 37. The connecting plate 32 is fixedly connected to a front central opening of the outer box body 2, the transparent protective plate 31 is fixedly connected to an outer side of a central opening of the connecting plate 32, and the display screen 33 is fixedly connected to an inner side of the central opening of the connecting plate 32. The battery 34 is fixedly connected to an inner lower central portion of the outer box body 2 through the battery cover 35. The circuit board 36 is fixedly connected to an inner lower rear side of the outer box body 2, a power terminal of the circuit board 36 is electrically connected to the battery 34, the charging module 37 is disposed at a rear side of the circuit board 36, and an output terminal of the circuit board 36 is electrically connected to the five-sided heating module 6.

Specifically, the charging module 37 is a wireless charging module or a wired charging module.

Figure 5:
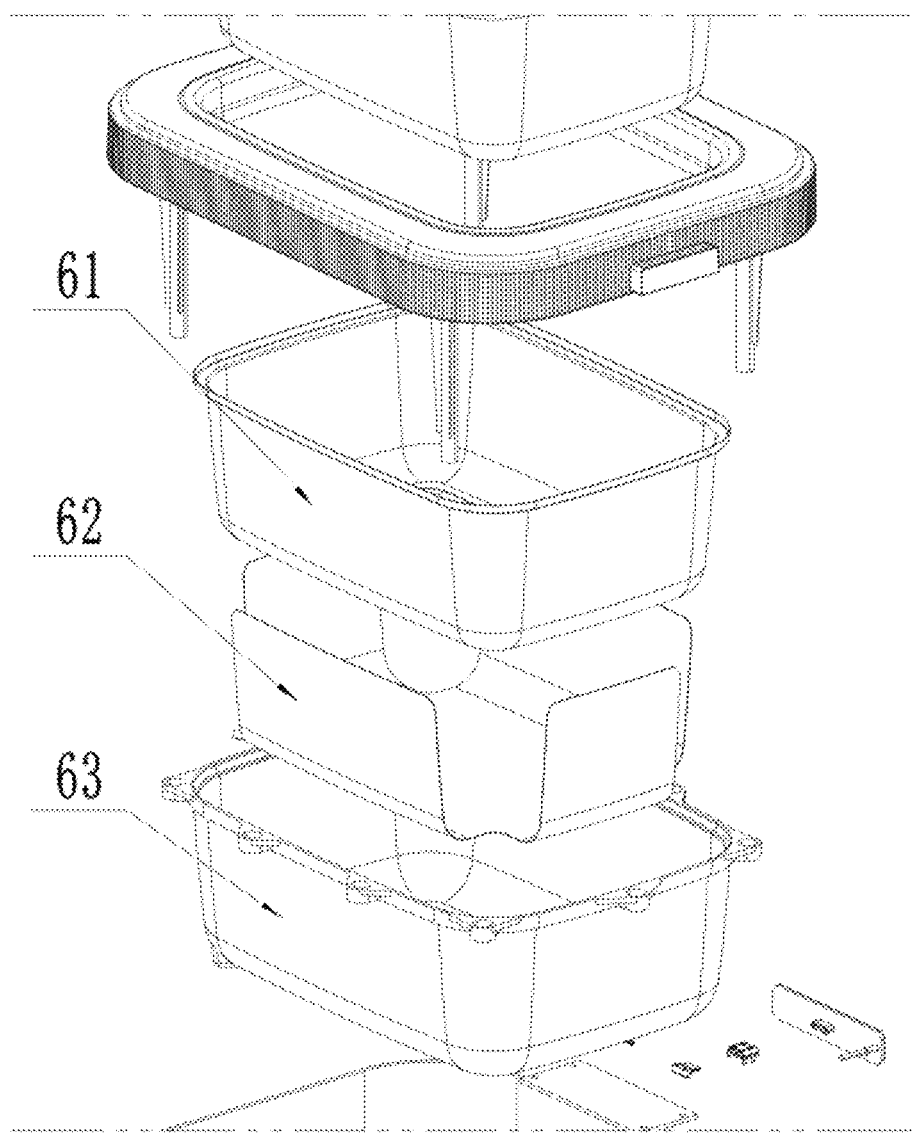
FIG. 5 is a structural schematic diagram of a five-sided heating module.

As shown in FIG. 5, the five-sided heating module 6 includes a heat-conducting inner liner 61, a five-sided heating sheet 62, and a heat-insulating box body 63. An outer portion of the heat-insulating box body 63 is fixedly connected to an inner portion of the outer box body 2 through the fixing frame 5, the heat-conducting inner liner 61 is fixedly connected to an inner portion of the heat-insulating box body 63, and the five-sided heating sheet 62 is fixedly connected to an outer surface of the heat-conducting inner liner 61.

Specifically, the five-sided heating sheet 62 is a graphene five-sided heating sheet 62.

The present disclosure is simple and reasonable in structure, with low manufacturing cost and convenient installation, and further has comprehensive functionality. During use, the user first lifts the multifunctional cover body 1, and easily opens the top cover 11 through the handle 13. The food container body 4 is then be removed from the upper side of the fixing frame 5 for food placement. During this process, the power supply display module 3 is observed. The transparent protective plate 31 covers the display screen 33, allowing the users to view a battery level of the battery 34. If the battery power is low, the outer box body 2 is placed on a wireless charging pad to charge the wireless charging and heating lunchbox through a wireless charging function of the charging module 37. Alternatively, a charging cable is connected to utilize wired charging capability of the charging module 37. The battery is connected to the inner lower central portion of the outer box body 2 and is fixed by the battery cover 35, the battery is configured to provide power to the wireless charging and heating lunchbox. After food is placed into the food container body 4, the food container body 4 is placed back into the outer box body 2, at this time, the food container body 4 is disposed on the inner upper side of the five-sided heating module 6. When heating is initiated, the two fixing clasps 15 of the multifunctional cover body 1 are respectively engaged with the protrusions at the central positions on both sides of the fixing frame 5, thereby securely connecting the multifunctional cover body 1 to an upper side of the fixing frame 5. The power supply display module 3 is then activated. Upon receiving a command signal, the circuit board 36 delivers electrical power from the battery 6 to the five-sided heating module 6. The heat-insulating box body 63 of the five-sided heating module 6 is fixed inside the outer box body 2, the graphene five-sided heating sheet 62 connected to the outer surface of the heat-conducting inner liner 61 begins to operate to uniformly heat the heat-conducting inner liner 61, and consequently apply five-sided heating to the food container body 4 placed therein, thereby ensuring even heating of food. For carrying, the wireless charging and heating lunchbox is easily lifted using the handle disposed on the multifunctional cover body 1. If utensils or other items stored in the accommodating groove 12 are needed, the covering portion 14 is opened to retrieve corresponding items. When not in use, the handle 13 is stored in the handle recess located at the upper side edge of the top cover 11 to prevent shaking, thereby ensuring stable transportation.

Control methods of the present disclosure are activated either manually or through current automation technologies. A wiring diagram of power components and provision of power supply are well-known in the art. Since the present disclosure is primarily directed to protecting a mechanical structure, detailed explanations of the control methods and wiring arrangements are not provided herein.

In description of the present disclosure, it should be understood that terms, such as "coaxial", "bottom", "end", "first end", "top", "middle", "second end", "upper", "side", "top", "inner", "front", "central", "two ends", etc. are merely used to facilitate describing the present disclosure and simplify the description, rather than indicating or implying that a device or component referred to has to have a specific orientation or be constructed and operated in a specific orientation, and therefore cannot be understood as a limitation to the present disclosure.

In the present disclosure, unless otherwise specified and limited, terms, such as "mount", "dispose", "connect", "fix", "threadedly connect", etc. should be understood in a broad sense, for example, such terms may refer to a fixed connection, a detachable connection, or an integral structure; a mechanical connection or an electrical connection; a direct connection or an indirect connection via an intermediate medium. The terms may also indicate internal communication between two components or the interaction between two components. Unless otherwise clearly specified, those who skilled in the art may understand specific meanings of these terms in the context of the present disclosure based on particular circumstances.

Basic principle and main features of the present disclosure and advantages of the present disclosure are shown and described above, and those who skilled in the art should understand that the present disclosure is not limited by the above embodiments. The above embodiments and the description are merely illustrative of the principles of the present disclosure, and various changes and modifications may be made without departing from a spirit and scope of the present disclosure, and these changes and improvements shall all fall within a scope of the present disclosure as claimed, and a specific protection scope of the present disclosure is defined by the appended claims and their equivalents.

What is claimed is:

1. A wireless charging and heating lunchbox, comprising:
    a multifunctional cover body;
    an outer box body;
    a power supply and display assembly;
    a food container body;
    a fixing frame; and
    a five-sided heating module;
    wherein the power supply and display assembly is disposed at an inner lower side of the outer box body;
    the five-sided heating module is fixedly connected in the outer box body through the fixing frame, and the five-sided heating module is electrically connected to the power supply and display assembly;
    the food container body is disposed at an inner upper side of the five-sided heating module; and
    the multifunctional cover body is connected to an upper side of the fixing frame,
    wherein the multifunctional cover body comprises a top cover, an accommodating groove, a handle, a covering portion, and two fixing clasps;
    wherein the accommodating groove is defined on one side of an upper surface of the top cover and is configured to receive an eating utensil, and the covering portion is disposed on the accommodating groove;
    wherein two ends of the handle extending downward is movably connected to central upper portions on both sides of the top cover; and
    the two fixing clasps are respectively movably connected to central lower portions of two side surfaces of the top cover, and upward-facing surfaces of lower portions of the two fixing clasps are respectively engaged with protrusions at central positions on both sides of the fixing frame.

2. The wireless charging and heating lunchbox according to claim 1, wherein the top cover comprises a handle recess at an upper side edge thereof for receiving the handle.

3. The wireless charging and heating lunchbox according to claim 2, wherein the handle recess is disposed around an edge of the upper side of the top cover so that when the handle is placed within the handle recess an upper side of the handle is substantially flush with the upper side of the top cover.

4. The wireless charging and heating lunchbox according to claim 1, wherein the power supply and display assembly comprises a transparent protective plate, a connecting plate, a display screen, a battery, a battery cover, a circuit board, and a charger;
    the connecting plate is fixedly connected to a front central opening of the outer box body, the transparent protective plate is fixedly connected to an outer side of a central opening of the connecting plate, and the display screen is fixedly connected to an inner side of the central opening of the connecting plate;
    the battery is fixedly connected to an inner lower central portion of the outer box body through the battery cover; and
    the circuit board is fixedly connected to an inner lower rear side of the outer box body, a power terminal of the circuit board is electrically connected to the battery, the charger is disposed at a rear side of the circuit board, and an output terminal of the circuit board is electrically connected to the five-sided heating module.

5. The wireless charging and heating lunchbox according to claim 4, wherein the charger is a wireless charger or a wired charger.

6. The wireless charging and heating lunchbox according to claim 1, wherein the five-sided heating module comprises a heat-conducting inner liner, a five-sided heating sheet, and a heat-insulating box body;
    an outer portion of the heat-insulating box body is fixedly connected to an inner portion of the outer box body through the fixing frame, the heat-conducting inner liner is fixedly connected to an inner portion of the heat-insulating box body, and the five-sided heating sheet is fixedly connected to an outer surface of the heat-conducting inner liner.

7. The wireless charging and heating lunchbox according to claim 6, wherein the five-sided heating sheet is a graphene five-sided heating sheet.

* * * * *